Oct. 21, 1941. J. E. LUCAS 2,259,648
BEARING FOR TRACTORS
Filed March 26, 1938

Inventor
Joseph E. Lucas
By Charles L. Reynolds
Attorney

Patented Oct. 21, 1941

2,259,648

UNITED STATES PATENT OFFICE 2,259,648

BEARING FOR TRACTORS

Joseph E. Lucas, Mercer Island, Wash., assignor of one-half to W. A. Castleton, Seattle, Wash.

Application March 26, 1938, Serial No. 198,236

8 Claims. (Cl. 308—36.1)

The proper maintenance of bearings which are exposed to entrance of dirt, as in the case of rollers guiding or supporting the creeping tread link belts of tractors, is a problem of considerable magnitude. The dirt is carried up by the tractor belts and falls down in the vicinity of the bearings. It tends to enter between the bearing surfaces, which carry heavy loads, and if permitted to enter or to remain long, is highly destructive. Similar problems arise wherever bearings are subjected to the possibility of entrance of dirt or like extraneous matter.

To avoid damage it is necessary either to design the bearing to prevent entrance of the dirt altogether, or to accept as inevitable the entrance of the dirt, and to expel it frequently, as by forcing lubricant through and out from the bearing surfaces. Dust and dirt tight bearings are generally expensive, require careful and skillful adjustment, and are too delicate for such heavy duty work as is required of tractor guide roller bearings. Moreover, they may produce an inordinate amount of friction, in a careless or unskillful attempt to make or keep them tight, they therefore wear rapidly and require careful and frequent inspection and renewal, and if dirt nevertheless finds its way in it is difficult to expel it without opening and thoroughly cleaning or renewing the bearing parts.

Tractors are a comparatively expensive piece of equipment, and must be kept in operation, without stoppage, as long as possible. If the tractor is not capable of operation, because of dirt in its bearings, its value is lost while it is out of operation, and, as well, the value of the time of its operator. Frequently other operations, dependent upon continued operation of the tractor, must be halted because of stoppage of the tractor, with attendant loss of time and money. Tractors are frequently used in places where facilities for inspection, repair, or cleaning of such bearings are crude or non-existent; they are frequently employed by persons having neither the time, facilities, nor ability to give such bearings the attention they require.

For these and other reasons such dirt tight bearings, using the materials and constructions heretofore alone considered suitable, have not been considered practicable for the use indicated, nor for analogous uses. Tractor bearings are therefore frequently left somewhat loose intentionally.

A loose bearing or packing, under such conditions, is not intended nor expected to prevent the entrance of dirt. Instead, reliance is placed upon frequently expelling the dirt from between the bearing or packing surfaces, this being accomplished by forcing lubricant into, through, and out of the bearing. The comparative looseness of the packing facilitates this (though also it facilitates entrance of dirt), but because the lubricant is used as the expelling agent, there is thus caused a considerable waste of lubricant. This waste of lubricant arises first, because good lubricant must be forced out as a vehicle to expel the dirt and to flush out the bearing, second, because the very looseness of the packing permits expulsion of more lubricant than would be expelled were the packing tighter, and third, because of natural extrusion of lubricant from the comparatively loose packing during operation, and as made less viscous by friction.

The waste of lubricant, however, is not the sole waste. Because the entrance of dirt is expected, and because it will (and does) cause wear if permitted to remain at all in contact with the bearing surfaces, it is necessary to expel it frequently—that is, to force lubricant through and out of the packing as frequently as is possible. This is thought of as lubricating the bearings, but actually its primary aim is the expulsion of dirt, and because dirt gathers and enters immediately operation of the tractor recommences, and should not be permitted to remain at all, the operator must compromise by "lubricating" as often as possible. It is accepted practice that a tractor should not be operated longer than a few hours without "lubricating," so that at least one, and sometimes more, stoppages are required in a working day for such otherwise unnecessary lubrication. The lubricant itself has by no means lost its lubricating qualities so soon, but the dirt, and the lubricant which holds it, must be expelled. Each such "lubrication" requires a considerable time, perhaps an hour, and thus occurs wastage of time and money value, directly and indirectly.

Such wastage of time, investment, and lubricant has been accepted heretofore as necessary, because it seems preferable and less wasteful on the whole than the employment of tight bearings and packings, and because tight bearings as heretofore formed, and packing materials heretofore used therein, are not suitable for long-continued, trouble-free operation.

It is the primary object of this invention to provide a bearing particularly adapted for use in heavy duty service and under such conditions as are encountered in tractors and the like, which will prevent entrance of dirt, which will therefore render unnecessary frequent stoppages, either for inspection, cleaning, or for "lubrication," and which as a result will permit uninterrupted operation of the tractor over periods of days, rather than hours, preventing loss of time, investment value, and lubricant, and which while dirt tight is nevertheless yieldable and productive of but little friction and wear.

It is also an object, generally stated, to provide a bearing, particularly for use under the conditions outlined, which will be strong, rugged, long lasting, and better suited, than bearings heretofore used for such duty, to the conditions met with therein.

A further object is the provision of a bearing structure and assembly which facilitates manufacture to close tolerances, yet at low cost, and which enables easy assembly.

More specifically it is an object to provide such a bearing which is or may be both a radial and an axial bearing, which has parts closely fitting, yet without undue friction, which is securely sealed at its ends against the possibility of coming apart, which is securely and permanently packed, which has provision for maintaining a reservoir of lubricant, and which includes a packing material which in itself will form a tight bearing, or which under the conditions of use, and in particular because of access of lubricant to the packing material, will swell and keep the bearing tight, and render unnecessary frequent expulsion of lubricant to expel dirt, yet will not produce undue friction.

With these and other objects in mind, as will appear hereafter from the detailed description and from the claims, and as may be ascertained from the drawing, wherein my invention is shown in a form at present preferred by me, my invention comprises the novel parts and the novel combination and arrangement thereof, as shown in the accompanying drawing, as will be described in this specification, and more particularly as defined in the claims which terminate the same.

Figures 1, 2, 3:
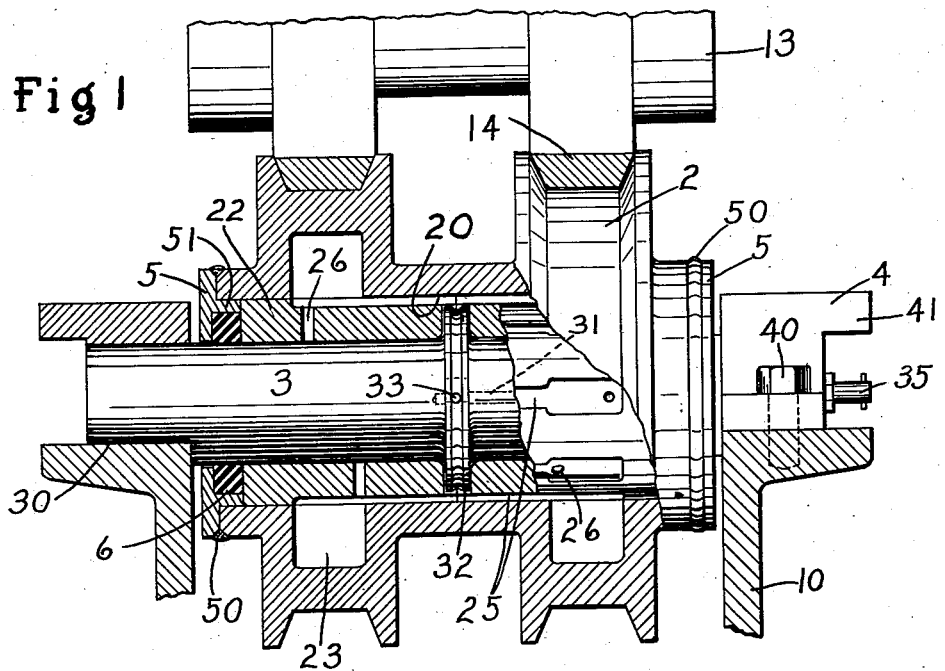
Figure 1 is in part an axial section and in part an elevation through such a bearing.
Figure 2 is a side elevation of a tractor tread, showing the environment in which such a bearing may be used.
Figure 3 is a transverse section through the structure shown in Figure 2.

The tractor includes frame elements 1 and 10, a wheel 11, which may be a front idler carried in a bearing 12 upon the frame, and a creeping tread belt, generally indicated by the numeral 13. The tread belt incorporates elements 14 which effect supporting contact with the terminal wheels 11 and with rollers 2, intermediate the terminal wheels, which support and guide the belt intermediate its ends.

The bearing which constitutes the principal subject-matter of this invention is shown in association with the rollers 2, but might be associated with other bearings in such a tractor, and indeed it may be incorporated as part of the main bearing 12. Further, while it is peculiarly adapted to meet the conditions encountered in such tractors, it will also be found useful in other uses, more particularly when, under the conditions of use, it is subject to access of dirt or grit to the bearings, and particularly when the service is heavy. The rollers 2 are shown as double rollers, but their external form and arrangement is largely immaterial. The roller shown in Figure 1 is one of the upper rollers, supporting the upper run of the belt, but the construction of the lower roller, spacing the intermediate portions of the belt from the frame, is or may be identical, and with only the bearing pin reversed, top for bottom.

The roller 2 is provided with an axial bore 20, and through this axial bore extends a pin 3. This pin is supported upon a frame member, as the element 10, and preferably is non-rotative with respect to the frame. To accomplish this it may be flattened, as indicated at 30, at each end, outside of the roller, this flattened portion engaging the flat surface of the frame which carries the pin, and the pin is held to the frame by a suitable means such as a cap 4 and bolts 40. The cap is provided with a protruding lip 41 for the purpose of protecting a lubricant fitting 35, of any suitable form, which is received in the end of the pin 3, admitting to a lubricant bore or channel 31.

As shown, the axial bore 20 of the roller is of considerably greater diameter than the diameter of the pin 3, and between the two is interposed a bushing or bushings 22. These bushings are preferably a press fit within the bore 20, and in effect constitute a part of the roller. They serve also the purpose of forming part of an axial bearing, in that the pin 3 is formed with a flange 32, between its ends and within the bore 20, and the bushings 22, inserted from opposite ends of the bore, come into engagement, with any amount of clearance desired, with the faces of the flange 32, to constitute the axial bearing. In addition the bushings 22, rotating with the wheel 2 about the non-rotative pin 3, constitute a radial bearing. It will be obvious, of course, that the roller might be stationary and the pin might rotate, or that the bushings might be fixed to the pin, and an axial thrust flange might be formed within the bore of the roller, these being mere reversals of the form shown and described.

Preferably the bushings 22 stop somewhat short of the outer ends of the bore 20, and these ends are closed by caps 5 which extend inwardly substantially to the pin 3. The caps are secured to the roller to rotate with the latter. Preferably they are permanently secured in place, as by welding, indicated at 50. Likewise they are provided with an axial extension 51 which engages the ends of the bushings 22 to maintain the latter in their proper position, and to hold their ends in engagement to maintain the desired clearance between the ends of the bushings and the flange 32. The caps 5 are so formed, in cooperation with the adjacent bushing and the pin, to constitute an annular packing chamber at each end of the bore 20, which chamber is filled with an annular ring 6, constituting the packing.

The material of which this packing ring is formed, and the manner of its securement in place, constitute important elements of this invention. The ring fits closely within the annular packing chamber, and is closely confined therein. It is formed of a material which is not fibrous, as is the usual packing material of felt or the like, but which, on the contrary is solid and homogeneous, and which per se, or under the conditions of use, will tend to swell or expand somewhat to press against the surfaces to be kept tight. Since the bearing is lubricated, through the fitting 35 and by means which will be explained in detail hereafter, and the lubricant tends to work its way outward along the pin 3 and between the pin and the bushings, the lubricant comes into contact with the ring 6, and if the ring 6 is made of rubber, or a like material which tends to swell when subjected to the oily lubricant, this closely confined ring of rubber will press against the pin and against all parts of its annular packing chamber, but being closely confined cannot escape. This swelling of such a solid material is to be distinguished from the apparent, but not actual, expansion of fibrous material resulting merely from an unbending or separating action of the fibers of which the material is composed. However, being of rubber and being kept moist by the lubricant, notwithstanding the solid character of such material and its swelling it is still yieldable and still moist, and constitutes an effective packing against entrance of dirt or other extraneous matter, as also against undesired extrusion of lubricant in appreciable quantities, yet it does not produce undue friction at this point.

In referring to the packing ring 6 as of rubber it is intended to use the term "rubber" in a broad sense, not as meaning essentially a pure rubber, or rubber from any particular source, but as including pure rubber or caoutchouc, and as well compositions of rubber or synthetic rubber, or any suitable material which tends to swell by molecular expansion, which can only be overcome by great pressure, either per se or under the influence of lubricants generally, or of any selected lubricant.

The roller is interiorly chambered, as indicated at 23, to form a lubricant reservoir. Lubricant is admitted or charged into this chamber by means of the fitting 35, the channel 31 with which the fitting communicates, radial passages 33, and grooves or channels 25 extending lengthwise of the bushings 22. The lubricant passes from the chamber 23 or direct from the channels 25 into the bearing between the bushings and the pin, or between the bushings and the flange 32, by means of suitable openings, as for instance the apertures 26.

Under some conditions of use it may be satisfactory to secure the caps 5 removably in place, but it is preferred, especially for such use as has been indicated, that the caps be permanently secured in place, as by a welding operation, referred to above. This prevents any possibility of the caps working loose, holds the ends of the bushings 22 in contact, and prevents undue expansion or slacking off of the compression of the rubber packing 6 due to its swelling, from whatever cause. The caps extend sufficiently close to the pin 3 that there is no appreciable opportunity for extrusion of rubber between the cap and the pin, but the rubber is confined closely within its packing chamber.

It is to be noted that the mechanical structure has been chosen to permit easy and cheap manufacture, though to close tolerances in most cases, and similar easy and cheap assembly. The bore 20 is a straight-through bore of unvarying size throughout, and requires only the simplest finishing operation. The internal bore of the bushings is of one size, interrupted only by the shoulder which contacts the flange 32, which shoulder, being at an end of a bushing half, is readily finished to a close tolerance. The pin itself is easily finished. The assembly is simple, as is obvious. The caps 5 need no particular finishing, save the center hole, for if they are a little too long the welding fills the gap. The assembly, then, is simple, cheap, yet accurate.

It has been found in use that such bearings, used in a creeping tread tractor under severe conditions of use, need not be lubricated oftener than once in several days, rather than once every few hours, and that it stands up under long periods of severe usage without appreciable wear in the bearing, and without undue deterioration of the rubber. Accordingly tractors equipped with such bearings may be kept in use continuously, and need only to be lubricated occasionally, that is, once every few days, to replace lubricant which has actually lost its lubricating qualities, and this can be done during periods when the tractor would not normally be in service, as at night.

While I have described the structure of the bearing, and the conditions of use with particularity, it should be understood that this is for the purpose of illustration, and that my invention is capable of embodiment in widely varying forms and structures, and of use in various environments, and is not to be limited otherwise than is stated in the accompanying claims. The principal novelty is inherent in the use of rubber as a packing material, under the conditions and for the uses herein explained.

What I claim as my invention is:

1. In combination with a roller having an axial bore of uniform size, a pin having a flange between its ends, two half bushings fitting closely within the roller's bore and having a bearing fit about the pin, the ends of said bushings being shouldered to bear against the side faces of the pin's flange, but to afford slight axial clearance for the flange, said bushing ends meeting outside of the flange to maintain such axial clearance, and means at each end of the bore to hold the half bushings against axial movement relative to the roller, and thus to retain their abutting ends in contact.

2. In combination with a roller having an axial bore of uniform size, a pin having a flange between its ends, two half bushings fitting closely within the roller's bore and having a bearing fit about the pin, the ends of said bushings being shouldered to bear against the side faces of the pin's flange, but to afford slight axial clearance for the flange, said bushing ends meeting outside of the flange to maintain such axial clearance, caps secured to the ends of the roller and closely about the pin, and having axially inward extensions engageable with the outer ends of the half bushings to hold the latter against axial movement relative to the roller, and thus to retain their abutting ends in contact, each such cap extension and the bushing end engaged thereby defining an annular packing chamber, and a packing ring of expansible material closely confined in each such chamber.

3. A seal for an internally lubricated shaft and sleeve bearing, comprising sealing material retaining means at the end of the bearing sleeve defining an annular recess encircling the shaft, and a sealing member of homogeneous, solid, non-fibrous material received in and closely embraced by the walls of such recess and making wiping contact with the shaft, said material having the characteristic of tending to expand by the action thereon of the bearing lubricant, and said means directing such expansion against the shaft.

4. A seal for an internally lubricated shaft and sleeve bearing, comprising a rubber ring encircling the shaft in wiping engagement therewith, and having the property of swelling by the action of the bearing lubricant thereon, and means defining an annular ring-receiving recess at an end of the bearing sleeve, closely embracing the sides and periphery of said rubber ring and restraining appreciable radially outward and axially lateral expansion thereof, said means thereby directing expansion of said ring radially inward against the shaft.

5. A seal for a shaft and sleeve bearing, comprising a yieldable rubber ring encircling the shaft in wiping engagement therewith, and means defining an annular ring-receiving recess at an end of the bearing sleeve, and being of such construction and dimensions relative to said rubber ring as to exert at all times radially inward and axial compressive force on said rubber ring, thereby to urge the inner ring periphery tightly against the bearing shaft.

6. A seal for a shaft and sleeve bearing, comprising a rubber ring encircling the shaft in wiping engagement therewith, and having a generally rectangular cross section, a cap centrally apertured to encircle the bearing shaft, and having an annular recess in one end thereof opening into its central aperture and receiving said rubber ring, the periphery and one side of said ring being contiguously engaged by the walls of such recess, and means secured both to said cap and to the bearing sleeve with the other side of said rubber ring contiguously abutting an end of the bearing sleeve, for restraining relative displacement of said cap and sleeve.

7. A seal for a shaft and sleeve bearing, comprising a rubber ring encircling the shaft in wiping engagement therewith, and having a generally rectangular cross section, a cap having a central aperture of a size to closely encircle the bearing shaft, and having an annular recess in one end thereof opening into its central aperture and receiving said rubber ring, the periphery and one side of said ring being contiguously engaged by the walls of such recess, and means secured both to said bearing sleeve and to said cap with the recessed end of the cap abutting an end of the bearing sleeve and with the other side of said rubber ring contiguously abutting the same end of the bearing sleeve, for restraining relative displacement of said cap and sleeve.

8. A seal for a lubricated bearing including a packing supporting member and a member movable relative to the packing supporting member, comprising packing means supported by the packing supporting member in wiping engagement with the relatively movable member, including a sealing element composed of homogeneous, solid, non-fibrous material having the property of swelling by the action of the bearing lubricant thereon, and means carried by the packing supporting member closely confining said sealing element and restraining appreciable expansion thereof in all directions other than toward such relatively movable member.

JOSEPH E. LUCAS.